Patented Oct. 10, 1939

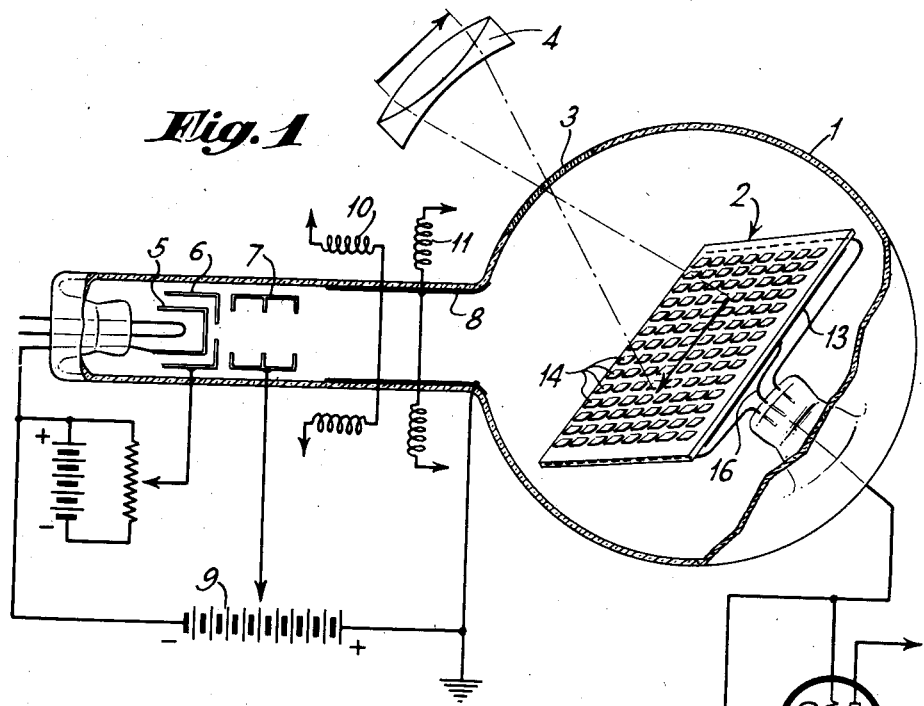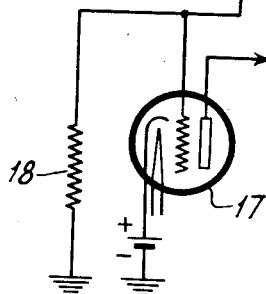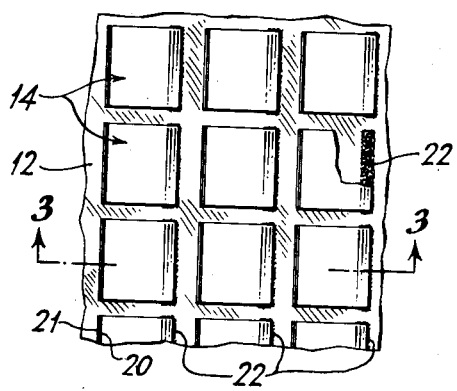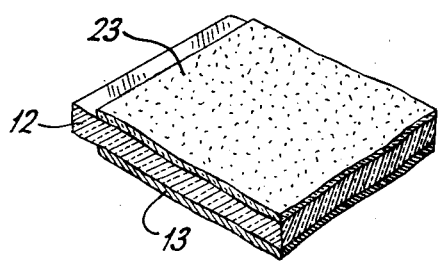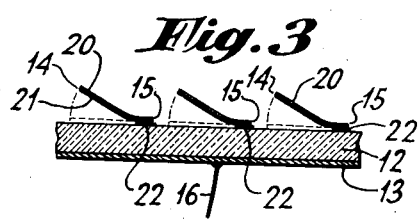

2,175,692

UNITED STATES PATENT OFFICE 2,175,692

TELEVISION TRANSMITTING TUBE

Harley A. Iams, Berkeley Heights, N. J., assignor, by mesne assignments, to Radio Corporation of America, New York, N. Y., a corporation of Delaware Application October 29, 1937, Serial No. 171,613

3 Claims. (Cl. 250—164)

My invention relates to picture or television transmitting tubes, and particularly to electrodes sensitive to light and heat for use in cathode ray tubes of this type.

The transmission of images of objects viewed through fog and haze is difficult and unsatisfactory with the usual form of cathode ray transmitting tube in which an optical image of an object of which a picture is to be transmitted is formed upon a front surface of a target or mosaic electrode consisting in general of an insulating sheet with a great number of discrete photosensitive elements on the front surface and a conductive coating on the other surface, the front or illuminated surface being scanned with a cathode ray beam to generate picture signals. The effectiveness of such a transmitting tube when used with infra-red light or radiation is limited by the photoelectric properties of available materials. Furthermore, all wavelengths in the infra-red spectrum are not equally effective in passing through fog and haze, such transmission depends upon the particle size of the material in the air which causes absorption or scattering of the light from the object. For light transmission with slight dispersion or attenuation, the wavelength of the incident light or radiation from the object viewed must be large in comparison with the particle size. Since much of the attenuation of the light is due to scattering, it has been found necessary to use a wavelength on which the light transmission is near unity in order to get sharpness of detail. Unfortunately, known photosensitive materials are not sufficiently sensitive to the short wavelengths of light which it is necessary to use to obtain transmission near unity. These wavelengths are outside the range of photoelectric sensitivity of even such a material as caesium.

Television transmitting tubes of the type above described depend for their operation on the charging of the particles comprising the surface of the mosaic electrode by the release of photoelectrons under the influence of the incident light, and upon the discharge of these particles by a cathode ray beam. The cathode ray beam upon impingement with the particles of the mosaic electrode releases secondary electrons, a large proportion of which are distributed among the particles on the surface of the electrode, and inasmuch as the electrostatic charges on the particles which have just been scanned are different from the charges on those which are about to be scanned, such distribution of the secondary electrons is non-uniform over the surface of the electrode. Non-uniform distribution of secondary electrons is also caused by the variation in electrostatic charge on the various particles in accordance with the light and shade of the optical image. Because of this non-uniform distribution of secondary electrons a spurious signal is generated in the output circuit of the device which varies in accordance with the scanning of the target electrode and with the degrees of light and shade of the optical image. Such distortional effects are commonly referred to as "dark spot signals".

It is an object of my invention to provide a television transmitting device which will produce satisfactory picture signals from infra-red light images, especially from images of objects viewed through fog and haze.

It is another object of my invention to provide a television transmitting device which will produce satisfactory picture signals having less distortional signal components such as those usually referred to as dark spot signals.

To this end I provide a target electrode for use in a television transmitting tube consisting of a heat insulating base, one side of which is coated with a continuous film of a conductor to serve as a signal plate, the opposite side being provided with a surface which when heated changes the electrostatic capacity between the surface and the signal plate. In one form of my invention this surface comprises a great number of individually separated bimetallic elements or leaves which, under the influence of heat generated by an incident optical or infra-red image, move in such a manner as to increase or decrease the capacitance between the leaves and the continuous metal film or signal plate on the opposite side of the heat insulator. An optical image of an object of which a view is to be transmitted is focused upon the target electrode to cause the bimetallic leaves to bend toward or away from the insulating base by an amount dependent upon the light energy incident upon the various leaves which are then scanned with a cathode ray beam to generate electrical impulses representative of the light values of elemental areas of the image. The electrical impulses which serve as picture signals may be amplified and applied to a cathode ray type of receiving tube to produce a visible reproduction of the image.

Other objects, features and advantages of my invention will appear from the following description taken in connection with the accompanying drawing in which:

Figure 1 is a diagrammatic view illustrating one form of my television device,

Figure 2 is an enlarged fragmentary view of a portion of the electrode structure shown in Figure 1, Figure 3 is a sectional view, the section taken on a line corresponding to the line 3—3 in Figure 2, and Figure 4 is an enlarged fragmentary view of a modification of the structure shown in Figures 2 and 3.

Referring to Fig. 1, the tube comprises a highly evacuated envelope or bulb 1 with a tubular arm or neck section enclosing a conventional type electron gun and a spherical section enclosing a flat screen or target electrode 2 so positioned that its front surface may be scanned by a beam of electrons from the electron gun and also may have projected upon it the image to be transmitted. Since the image may be produced principally by infra-red light and the usual glasses do not transmit as well as desired wavelengths greater than 3 microns, I prefer to provide, in the wall of the bulb 1 in registry with the target electrode 2, a window 3 with transmission characteristics such that infra-red rays of the desired wavelength may pass through the window to the target electrode 2. The window may be made of material such as quartz or fused silica to admit the infra-red light or the entire tube or, at least, the entire spherical section may be made of quartz for this purpose. Other materials such as fluorite, rock salt or potassium chloride may be used for the window depending on the wavelength of the light to be used. The image is focused on the target electrode 2 by a lens system 4 made of similar materials and mounted in front of the window.

The electron gun assembly is of the conventional type and comprises a cathode 5, a control electrode 6 connected to the usual biasing battery, and a first anode 7 maintained positive with respect to the cathode 5. The electron stream leaving the first anode 7 is accelerated and is also concentrated into an electron scanning beam focused on the front surface of the target 2 by a second anode 8, preferably a conductive coating on the surface of the envelope 1 near the neck of the bulb. The first anode 7 and the second anode 8 are maintained at the desired positive potentials with respect to the cathode 5 by a battery 9. Conventional deflection means, such as deflection coils 10 and 11, may be used to sweep the beam in a horizontal and vertical plane, respectively, to scan the target. It is obvious that conventional electrostatic deflection plates may be substituted for one or both of the deflection coils if desired.

In accordance with my invention the target or screen electrode, one surface of which is scanned by an electron beam and on which the image to be transmitted is focused, as best shown in Figures 2 and 3, comprises a heat insulating foundation member 12, one side of which is coated with a film 13 of conducting material, such as platinum, the opposite side of the foundation member 12 supporting the individually separated bimetallic leaves 14. The leaves 14 are preferably pivotally supported in fixed relation with respect to the foundation 12 at one edge only, such as the edge 15, so that they will be free to move with this edge as an axis. A lead 16 is attached to the film of metal 13 and extends through the wall of the envelope 1 connecting the metal film 13 to the input circuit of a translating device 17 and to the second anode 8 through an impedance 18.

In making the target electrode 2 I select a thin sheet of mica of uniform thickness to serve as the foundation member 12, and apply to one side of this mica sheet a thin film of silver to serve as a signal plate by coating the mica with a liquid carrier having suspended therein finely divided silver particles. The mica sheet is then baked in an oven to volatilize the carrier and form a continuous metallic film 13 on the coated side of the sheet. The bimetallic elements or leaves 14 are then fastened to the side of the foundation opposite the metallic film 13, preferably along one side, such as the side 15, so that they are pivotally connected to the foundation and free to move toward or away from the foundation.

The bimetallic leaves 14 are preferably made of metals 20 and 21 which have coefficients of expansion which differ widely. Thus the metal 20 may be molybdenum or nickel and the metal 21 may be silver or zinc.

The bimetallic leaves may be made in a number of ways, two of which will be described. In the first method I prefer to form the leaves by successive vaporization of the two metals from which the leaves are made, causing the metals to condense upon a base as individual films one upon the other. More specifically, the silver or zinc may be evaporated and allowed to condense upon a film of collodion or other soluble material deposited on a glass or mica base supported in an evacuated vessel. The process of vaporization is continued until a film of metal is obtained of the desired thickness, which I have found to be between one to three microns. The molybdenum or nickel is then vaporized and caused to condense upon the silver or zinc film, the vaporization and condensation being continued until a film of molybdenum or silver of similar thickness is obtained. The base carrying the film of collodion and the two films of metal is then removed from the evacuated vessel and the metal surface ruled to separate the metal film into the separate leaves 17. The leaves are removed from the base member by dissolving the collodion film and the individual leaves are fastened to the foundation member 12 along the edges 15 by cementous material 22. For this purpose I have found the silver paste described above in connection with the coating of the mica foundation sheet to be particularly advantageous. In another preferred method of forming the bimetallic leaves 17 the metal forming the leaves is deposited directly upon the foundation member 12 which eliminates the necessity for fastening the individual leaves on the foundation. To follow this method of preparation I prefer to coat the surface of the foundation member 12 opposite that bearing the continuous metallic film 13 with collodion or other soluble material leaving individual portions of the foundation member free of the collodion at positions corresponding to the desired location of the boundary 15 of each of the individual leaves. The two metals are then applied as above described, followed by ruling the metallic films to separate them into the individual leaves 17. The collodion or other soluble material is removed allowing the individual leaves to be supported along the edges 15, that is, at the points on the foundation member not coated with the collodion.

In the modification shown in Fig. 4 it is contemplated to omit the individual particles or leaves 17 and to substitute therefore a continuous film of dielectric material 23 which, when subjected to different degrees of heat, exhibits corresponding variations of dielectric constant. The dielectric constant of elemental areas of such a film varies in accordance with the temperature of the elemental areas and thus will vary in accordance with the intensity of the light incident thereon, especially if such light has a wavelength in the red or infra-red portion of the spectrum.

While I do not wish to be restricted to any particular theory of operation it seems probable that when an optical or infra-red image is projected on the film 23 the dielectric constant of the elemental areas of the film varies in accordance with the temperature of the elemental areas produced by the varying degrees of light and shade of the optical image. Thus when the dielectric film is scanned by an electron beam the signal produced will be proportional to the dielectric constant of the elemental areas being scanned and consequently the developed signal will be proportional to the light or heat incident upon the various elemental areas of the dielectric. Likewise in the modification of my invention incorporating a multiplicity of bimetallic leaves, it is believed that each leaf becomes heated to an extent dependent upon the intensity of that portion of the infra-red or optical image incident thereon and bends toward or away from the base on which it is supported by reason of the differential expansion of the metals comprising the leaves. Each bimetallic leaf consequently has variable electrostatic capacity with respect to the metallic coating on the opposite side of the base, the value of this electrostatic capacity depending upon its position with respect to the metallic coating. Each time the scanning electron beam from the electron gun impinges on the bimetallic leaves an electrical impulse is generated in the output circuit, the value of which depends on the intensity of the infra-red or optical image on the various leaves. The voltage drop produced by the current flow in the impedance 18 is representative of the picture signals and may be impressed on the input circuit of the translating device 17, to be further amplified and applied to a transmitting network in a manner well known in the art.

From the foregoing description it will be apparent that various other modifications may be made in my invention without departing from the spirit and scope thereof and I desire, therefore, that only such limitations shall be placed thereon as are necessitated by the prior art and set forth in the appended claims.

I claim:

1. An electrode for a television transmitting tube comprising an insulating foundation member, a plurality of bimetallic elements arranged over one side of said foundation member and pivotally connected thereto, said elements being composed of metals having different coefficients of expansion, that having the larger coefficient of expansion being adjacent the foundation member, and a continuous metallic coating on the opposite side of said foundation.

2. An electrode for a television transmitting tube comprising an insulating foundation member, a plurality of bimetallic elements arranged over one side of said foundation member and pivotally connected thereto, said elements being composed of two films of metal having different coefficients of expansion, that having the larger coefficient of expansion being adjacent the foundation member and a layer of electrically conducting material in capacitive relation with said bimetallic elements.

3. An electrode for a television transmitting tube comprising a plurality of mutually insulated and separated bimetallic elements, said elements being composed of metals having different coefficients of expansion, an electrode coextensive with and in capacitive relation with said bimetallic elements, the elements being pivotally supported with respect to said electrode, the metal of said elements having the larger coefficient of expansion being adjacent the said electrode.

HARLEY A. IAMS.